US008612339B2

(12) United States Patent
Rose et al.

(10) Patent No.: US 8,612,339 B2
(45) Date of Patent: Dec. 17, 2013

(54) SYSTEM AND METHOD FOR BUSINESS ONLINE ACCOUNT OPENING

(75) Inventors: Teresa Rose, Raleigh, NC (US); Lori Hall, Cary, NC (US); Douglas Joel Zickafoose, Raleigh, NC (US)

(73) Assignee: Branch Banking & Trust Company, Raleigh, NC (US)

( * ) Notice: Subject to any disclaimer, the term of this patent is extended or adjusted under 35 U.S.C. 154(b) by 886 days.

(21) Appl. No.: 12/540,188

(22) Filed: Aug. 12, 2009

(65) Prior Publication Data

US 2010/0042533 A1 Feb. 18, 2010

Related U.S. Application Data

(60) Provisional application No. 61/088,267, filed on Aug. 12, 2008, provisional application No. 61/088,229, filed on Aug. 12, 2008, provisional application No. 61/088,239, filed on Aug. 12, 2008.

(51) Int. Cl.
*G06Q 40/00* (2012.01)
(52) U.S. Cl.
USPC ............... 705/38; 235/379; 705/26; 455/456; 707/68
(58) Field of Classification Search
None
See application file for complete search history.

(56) References Cited

U.S. PATENT DOCUMENTS

| | | | | |
|---|---|---|---|---|
| 7,849,003 | B2 * | 12/2010 | Egnatios et al. | 705/38 |
| 2002/0055909 | A1 * | 5/2002 | Fung et al. | 705/42 |
| 2002/0120582 | A1 * | 8/2002 | Elston et al. | 705/64 |
| 2002/0120846 | A1 * | 8/2002 | Stewart et al. | 713/168 |
| 2003/0036996 | A1 * | 2/2003 | Lazerson | 705/38 |
| 2007/0061254 | A1 * | 3/2007 | Blunck et al. | 705/39 |
| 2008/0010198 | A1 * | 1/2008 | Eliscu | 705/40 |
| 2008/0167956 | A1 * | 7/2008 | Keithley | 705/14 |
| 2008/0301022 | A1 * | 12/2008 | Patel et al. | 705/35 |
| 2011/0270753 | A1 * | 11/2011 | Pinski | 705/44 |
| 2011/0270754 | A1 * | 11/2011 | Kelly et al. | 705/44 |

OTHER PUBLICATIONS

Timothy R. White, How to Implement Risk-Based OFAC Monitoring Practices, ABA Comliance, Sep./Oct. 2007 (OFAC).*
Osborne, Paul R, Effective BSA Compliance Demands a Risk-Based Approach, ABA Bank Compliance v26n3 pp. 3-4, Mar./Apr. 2005 (Effective BSA Compliance).*

* cited by examiner

*Primary Examiner* — Chika Ojiaku
(74) *Attorney, Agent, or Firm* — Duane Morris LLP

(57) ABSTRACT

A system and method for a business customer interfacing with a financial institution through a computer network is presented. The method includes a determination of whether the customer is an on-line client of the financial institution, a verification of customer-provided information with a pre-existing client identification profile for the customer, a determination of whether the customer is a sole proprietorship, a determination of the customer's credit score using a set of predetermined criteria, and presenting a set of account options based at least in part on the verification of the customer-provided information and the customer's credit score. Additional customer-provided information may be received and verified and used to enroll the client in one or more programs offered by the financial institution at a predefined level based at least on one or more predetermined factors.

24 Claims, 9 Drawing Sheets

FIRST SET OF PREDETERMINED CRITERIA

- IS CUSTOMER NEW OR EXISTING CLIENT OF FINANCIAL INSTITUTION
- HAS CUSTOMER BEEN IDENTIFIED AS FRAUDSTER OF ABUSER BY FINANCIAL INSTITUTION
- HAS CUSTOMER BEEN IDENTIFIED AS FRAUDSTER BY SECOND FINANCIAL INSTITUTION
- DOES CUSTOMER IDENTITY VERIFICATION SCORE EXCEED A PREDETERMINED THRESHOLD

FIGURE 10A

SECOND SET OF PREDETERMINED CRITERIA

- IS CUSTOMER NEW OR EXISTING CLIENT OF FINANCIAL INSTITUTION
- HAS AUTHORIZED AGENT BEEN IDENTIFIED AS FRAUDSTER OF ABUSER BY FINANCIAL INSTITUTION
- HAS AUTHORIZED AGENT BEEN IDENTIFIED AS FRAUDSTER BY SECOND FINANCIAL INSTITUTION
- DOES CUSTOMER IDENTITY VERIFICATION SCORE FOR AUTHORIZED AGENT EXCEED A PREDETERMINED THRESHOLD

FIGURE 10B

PREDETERMINED SET OF BUSINESS RULES

- GO/NO GO OF SSN EVALUATION
- GO/NO GO OF ID THEFT EVALUATION
- GO/NO GO OF RETAIL INDICATOR EVALUATION
- GO/NO GO OF PREVIOUS INQUIRY EVALUATION
- GO/NO GO OF CLOSURE SUMMARY EVALUATION
- GO/NO GO OF CLOSURE DETAILS EVALUATION

FIGURE 11A

PREDETERMINED SET OF RISK EVALUATION RULES

- GO/NO GO OF SSN EVALUATION
- GO/NO GO OF ID THEFT EVALUATION
- GO/NO GO OF RETAIL INDICATOR EVALUATION
- GO/NO GO OF PREVIOUS INQUIRY EVALUATION
- GO/NO GO OF CLOSURE SUMMARY EVALUATION
- GO/NO GO OF CLOSURE DETAILS EVALUATION

FIGURE 11B

SYSTEM AND METHOD FOR BUSINESS ONLINE ACCOUNT OPENING

RELATED AND CO-PENDING APPLICATIONS

This application claims priority to the following co-pending provisional applications, the entirety of each is hereby incorporated herein by reference in its entirety: "System and Method for Business Online Account Opening", Ser. No. 61/088,267 filed 12 Aug. 2008; "System and Method for Retail Online Account", Ser. No. 61/088,229 filed 12 Aug. 2008; and "System and Method for an Electronic Lending System", Ser. No. 61/088,239 filed 12 Aug. 2008. Additionally, this application hereby incorporates herein by reference, in their entirety, each of the following concurrently-filed applications: "System and Method for Retail Online Account Opening", Ser. No. 12/540,179, filed 12 Aug. 2009; and "System and Method for an Electronic Lending System", Ser. No. 12/540,153, filed 12 Aug. 2009.

BACKGROUND

Increasingly the public is going on-line for a variety of transactions and information. More than 30% of the population have personal computers and modems. Furthermore, over 60% of people with bank accounts have personal computers and modems. At the same time the number of people subscribing and using on-line services is greater than 40 million, and this number is growing at an exponential rate.

As the public uses computers with a greater frequency, more financial transactions are being automated and performed via computer. There is good motivation to bank on-line. On-line banking provides convenience, safety, cost savings, and potentially new types of services not readily or conveniently available via in-person banking. Such potentially new services include access to superior up-to-the minute information, on-line investment clubs, information filters, and search agents.

With the increase in the number of financial transactions performed on-line, the convenience and cost-savings of banking on-line also increases. Additionally new and more powerful methods are being developed for protecting the security of financial transactions performed on-line. The result is that convenience, cost savings and enhanced security have combined to make on-line financial services more useful and effective, thereby driving the development of newer and more integrated services. More sophisticated financial systems that offer greater integration and a high degree of user control enable on-line users to synthesize, monitor, and analyze a wide array of financial transactions and personal financial data.

Currently, methods exist for users to perform a variety of on-line financial transactions. These methods however fail to offer on-line account opening including qualification verifications. For example, users may bank on-line, thereby enabling performance of transactions, such as transfers from one account to another, but must already have the established account in the financial institution.

In view of the increase of electronic commerce in the market place the present subject matter discloses a unique on-line account opening method. The disclosed subject matter enables a stream-lined entry to an on-line banking presence.

A method is needed in which business customers may establish an on-line account, be enrolled in financial offerings as a result of qualification and verification of the qualification based on a set of criteria.

In order to obviate the deficiencies of the prior art, the present disclosure presents a novel method for interfacing with a financial institution using a computer interface. In the method a customer request is received from a customer that has reached a predetermined webpage of the financial institution using a computer network. A first content is presented to the customer, and a first input is received from the customer. If the customer is an on-line client of the financial institution then a first set of information is received from the customer for determining the same, the first set of information of the on-line client is authenticated and verified with a pre-existing client identification profile for the customer. A second set of information is received from the customer and presented back to the customer for review.

In the method, a third set of information is further received from the customer, the third set of information including the second set of information and any modification to the second set of information made by the customer upon their review. The terms and conditions are presented to the customer and an application is received from the customer. The first part of the third set of information is verified if the customer is a sole proprietor and the second part of the third set of information is verified if the customer is not a sole proprietor using a first set of predetermined criteria.

In the method, the customer's credit score is determined using a second set of predetermined criteria and a set of account options is presented to the customer, the account options presented being based at least in part on the verification of the third set of information and the customer's credit score. A second input is received from the customer; the second input is verified and it is determined if the customer is to be enrolled for a check card. The customer is processed for check card enrollment at a predefined level based at least on one or more predetermined factors.

Also in the method, it is determined if the customer is to be enrolled in a business on-line program and a merchant services program. The customer is processed for enrollment in the merchant services program at a predefined level based at least in part on one or more predetermined factors. The customer is then presented with information related to the customer's products accounts and/or enrollments.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIG. 10A is a representative chart listing criteria that makes up a first set of predetermined criteria according to an embodiment of the disclosed subject matter.

FIG. 10B is a representative chart listing criteria that makes up a second set of predetermined criteria according to an embodiment of the disclosed subject matter.

FIG. 11A is a representative chart listing business rules that makes up a predetermined set of business rules according to an embodiment of the disclosed subject matter.

FIG. 11B is a representative chart listing risk evaluation rules that make up a predetermined set of risk evaluation rules according to an embodiment of the disclosed subject matter.

DETAILED DESCRIPTION

Figure 1:
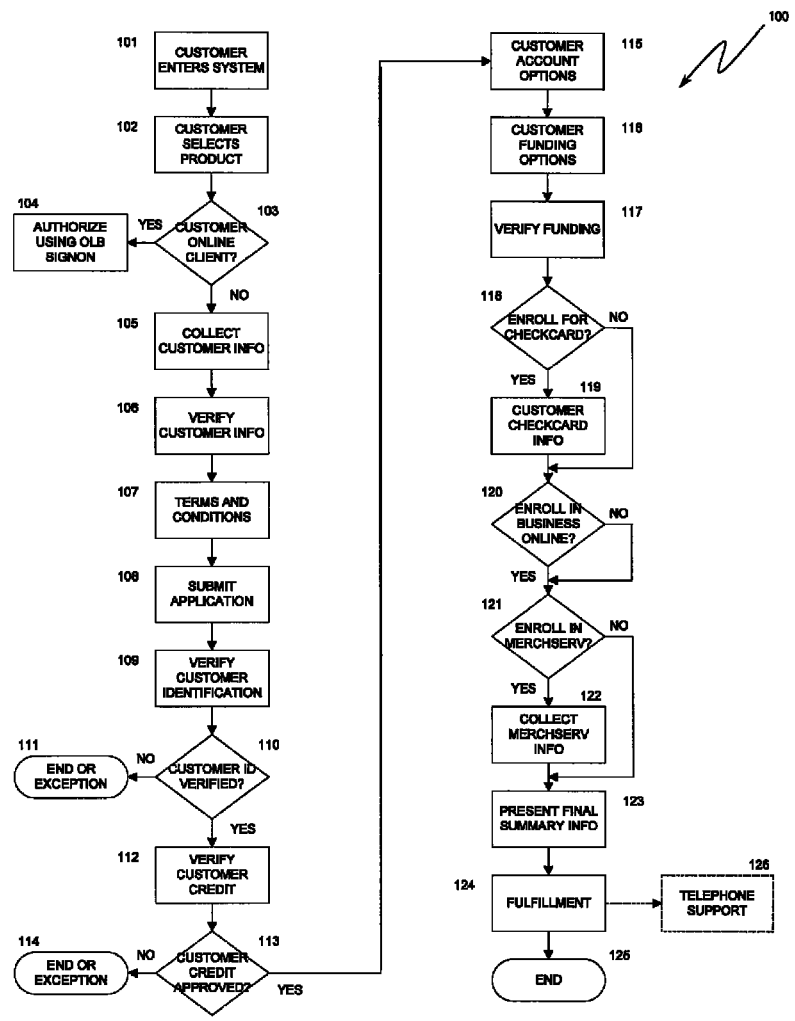
FIG. 1 is a flow chart of an embodiment of the disclosed subject matter.

FIG. 1 illustrates a process in which a customer may open an on-line business account via a computer network, e.g., the Internet, by accessing and exchanging information using the website of a financial institution. The customer enters the system by accessing or being directed to the institutions' website (webpage) as shown in Block 101. In either event, a request for the website is received by the financial institution's server or proxy server. The customer is presented a list of products such as a checking account, savings account, or brokerage account or any of a number of financial products offered by the institution. These financial products may also include a deposit account, which may be in the form of a certificate of deposit, individual retirement account, retirement account, a 401(k) account or combination thereof. The products presented to the customer may also be a function of path used by the customer to arrive at the website. For example, if the customer accessed the website via a hyperlink on another site directed to retirement, only the retirement accounts may be presented, or the entire scope of products is presented but the retirement accounts are highlighted. In this manner, the most relevant products based on the customers path may be brought to the customers attention.

Figure 2:
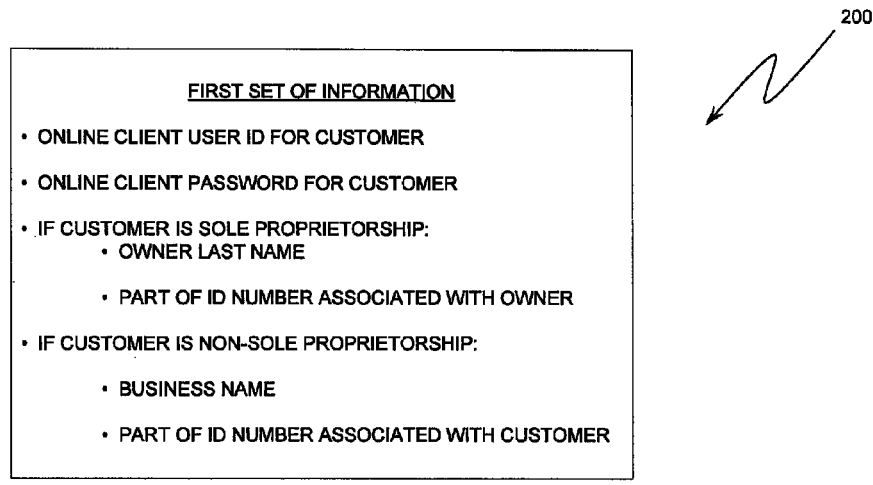
FIG. 2 is a representative chart listing information that makes up a first set of information according to an embodiment of the disclosed subject matter.

Following FIG. 1, the customer may then select a product from the products presented as shown in Block 102. The customer's choice is received by the server. An evaluation of whether the customer is a current on-line client of the financial institution takes place as shown in Block 103. Existing on-line customers advantageously are given the opportunity to streamline the application process. A first set of information is requested of and received from the customer in determining if the customer is a current on-line client. The first set of information may include an on-line client user ID for the customer, an on-line client password for the customer, and if the customer is a sole proprietorship, the last name of the owner and/or part of the ID number associated with the owner and if the customer is not a sole proprietor, the business name and/or part of the ID number associated with the customer, as shown in FIG. 2, or other identifying indicia/code that enables the identification of the customer to the customer's established account(s). Upon receiving the first set of information, the information is authenticated with the on-line information kept or known by the financial institution and a pre-existing client identification profile is verified. If the customer is determined to be a current on-line client as shown in Block 103, then the customer is authorized using on-line banking sign on as shown in Block 104.

Figure 3:
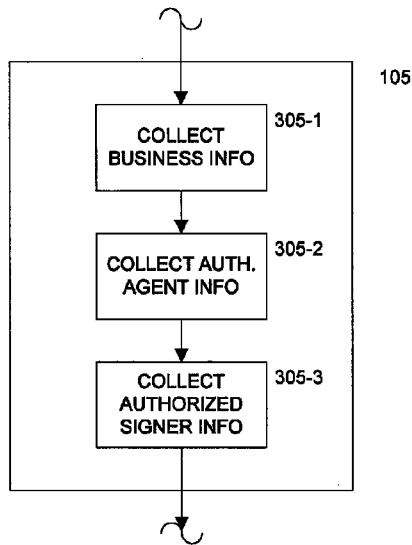
FIG. 3 is a flow chart representing collection of information according an embodiment of the disclosed subject matter.

If the customer is not a current on-line client of the financial institution, a second set of information is requested and collected from the customer as shown in Block 105. FIG. 3 illustrates a number of steps that may be included in collecting the second set of information.

FIG. 3 show the collection of business information in Block 305-1, authorized agent information in Block 305-2 and the collection of an authorized signer information in Block 305-3. This second set of information may include a wide variety of business information including business name, physical address, headquarter, phone number, organization type, establishment date, domestic or foreign, State of incorporation, other DBAs, industry, business classification, sales and/or number of employees. The customer may select the type of identification from a dropdown list that includes common ID types. Table 1 lists the Business Type and Common ID type.

TABLE 1

| Business Type | Common ID Type |
| --- | --- |
| General Partnership | Partnership Agreement |
| LLP | Articles of Partnership |
| LLC | Articles of Limited Incorporation |
| Corporation | Articles of Incorporation |
| All Non-Sole Proprietorships | Business License |

The authorized Agent information may include owner information as well. Examples of the authorized agent information include the name of the authorized agent, his/her physical address, date of birth, SSN, relationship to the company (e.g. Owner, Partner, Manager, Member, President, Vice President, Secretary, Treasure or other), contact information such as phone numbers and email addresses, citizenship, and information regarding the characteristics of the identification (e.g. type, ID Number, State of issuance, issue date and expiration date). The authorized signer or business resolution information collected in Block 305-3 may include information on signers who may legally bind the customer. The information may include name of signer(s), Title as well as other information related to the signers.

The second set of information is verified as shown in Block 106. This verification may include presenting back to the customer for review the second set of information and receiving a third set of information which includes any corrections to the second set of information the customer has made. The website may allow and request the customer to annotate, modify or otherwise change incorrect or incomplete information upon its presentation to the customer. The third set of information may include as noted previously several parts. The customer is also provided with a set of terms and conditions which may govern the use of the website, on-line banking, application process, liabilities, etc, as shown in Block 107. The terms and conditions may also include a customer check-off which may be required to continue and ensure they have been at least noticed, if not reviewed by the customer. An application for a product may be submitted by and received from the customer as shown in Block 108.

The customer identification is then verified in Block 109. An embodiment of a process to verify the customer identification is shown on FIG. 4. The customer is first determined to either be a sole proprietorship or not as shown in Block 409-1.

If the customer is a sole proprietorship, a first part of the third information may be determined as shown in Block 409-2. This may include providing information to a third party or to an institution-operated database such as may be owned and/or operated by a financial institution. The first part of the third information may be evaluated as shown in Block 409-4, this evaluation may be based on a comparison of known information with the information collected from the customer as the first part of the third set of information. This evaluation may utilize a first set of predetermined criteria. The first set of predetermined criteria, as listed in FIG. 10A, may include whether the customer is a new or an existing client of the financial institution; whether the customer has been identified as a fraudster or abuser; whether the customer has been identified as a fraudster by a third party and whether the customer identity verification score exceeds a predetermined threshold. These and other criteria may be used to assess the legitimacy of the customer and may be included in the set of predetermined criteria in verifying the first part of the third set of Information. Upon evaluation, a score or index may be determined reflective of the outcome of the evaluation. For example, if the name, address, phone number and SSN match, a score reflecting a high matching comparison may be given, whereas when one or more of these do not match, a score reflecting a lower matching comparison may be applied. The customer may then be queried regarding answers related to his/her identity for verification as shown in Block 409-6. Questions in the query may include for example information typically known only to the individual, such as mother's maiden name, previous address, banking accounts, etc. The answers provided by the customer may be verified in Block 409-8. Based on the score or index relating to the first part of the third information and the verification of the customers answer to the identity query the customer may be authenticated as shown in Block 409-10.

Figure 5A:
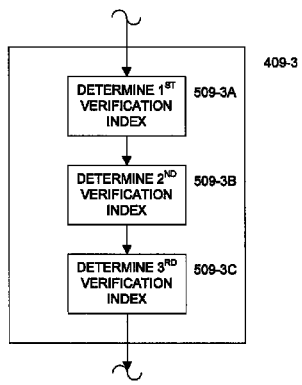
FIG. 5A is a flow chart representing the determination of verification index according to an embodiment of the disclosed subject matter.
Figure 5B:
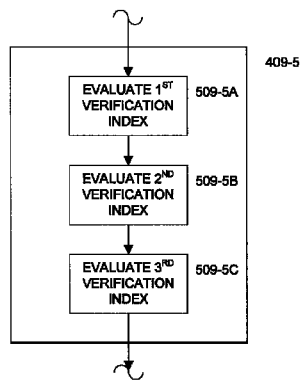
FIG. 5B is a flow chart representing the evaluation of verification index according to an embodiment of the disclosed subject matter.

If the customer is determined not to be a sole proprietorship in decision Block 409-1, then a second part of the third information may be determined as shown in Block 409-3. The second part of the third information may be evaluated as shown in Block 409-5. This evaluation may utilize a second set of predetermined criteria. The second set of predetermined criteria, as listed in FIG. 10B, may include whether the customer is a new or an existing client of the financial institution; whether the customer has been identified as a fraudster or abuser; whether the customer has been identified as a fraudster by a third party and whether the customer identity verification score exceeds a predetermined threshold. These and other criteria used to assess the legitimacy of the customer may be included in the second set of predetermined criteria in verifying the second part of the third set of Information. The first part of the third set of information and the second part of the third set of information may have common information and thus need not be mutually exclusive. These criteria allow for the application of internal decisioning rules. FIGS. 5A and 5B show steps that may be used in verifying the second part of the third set of information.

Turning to FIG. 5A, a first verification index is determined as shown in Block 509-3A. A second verification index is determined as shown in Block 509-3B and a third verification index is determined in Block 509-3C. Each verification index represents evaluations using a particular set or area of information. The sets or areas of information may or may not be mutually exclusive. One verification index may be based on the business information which includes searches drawn from public business records and business directories. Another verification index may be based on the applicant information, for example name, address, Social Security Number (SSN) and contact information. Yet another verification index may be based on the relationship between the business and the authorized representative. This latter index may be based on the degree to which the agent can be linked to the business based on public records. These verification indices may be performed internal to the financial institution or by a third party. In FIG. 5B, the first, second and third verification indices are evaluated in Blocks 509-5A, 509-5B and 509-5C, respectively. Additional verification indices may also be employed.

Figure 6:
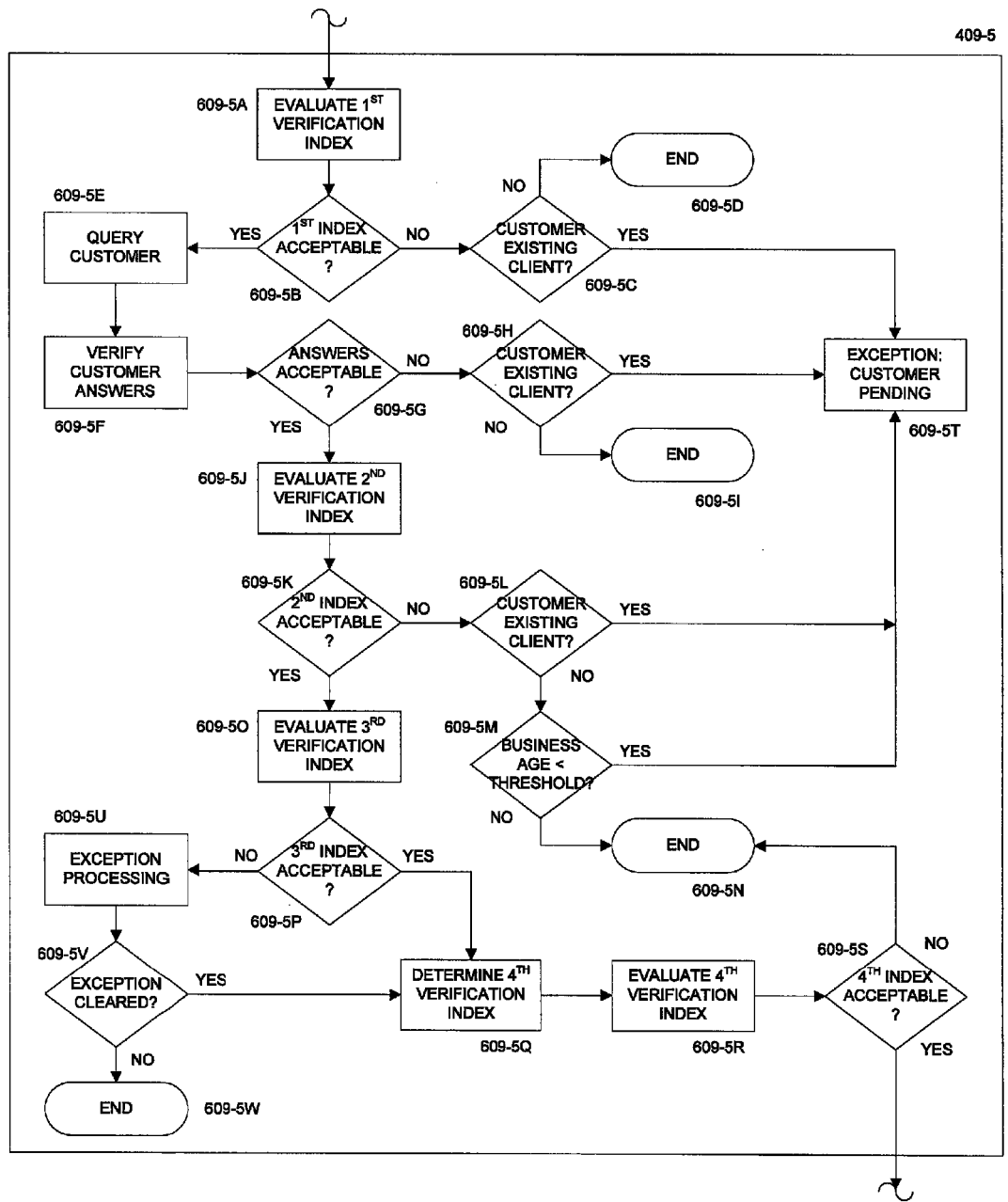
FIG. 6 is a flow chart representing the acceptance of a customer including exceptions of the verification indices according to an embodiment of the disclosed subject matter.

FIG. 6 is a flow chart demonstrating the uses of the verification indices in the internal decision making process as noted earlier. The first verification index is evaluated as shown in Block 609-5A. The first verification index is then compared to a threshold to determining if it is acceptable as shown in Block 609-5B. If the first index is not acceptable then the decision process looks to whether the customer is an existing client as shown in Block 609-5C. If the customer is not an existing client the application process ends as shown the Block 609-5D. If on the other hand, the customer is an existing client or some other trigger is met, the customer is provided an exception to terminating the process and a decision to proceed becomes pending as shown in Block 609-5T. Customers pending may be manually reviewed by the financial institution, however information and product presentation may continue until the review is completed.

Figure 4:
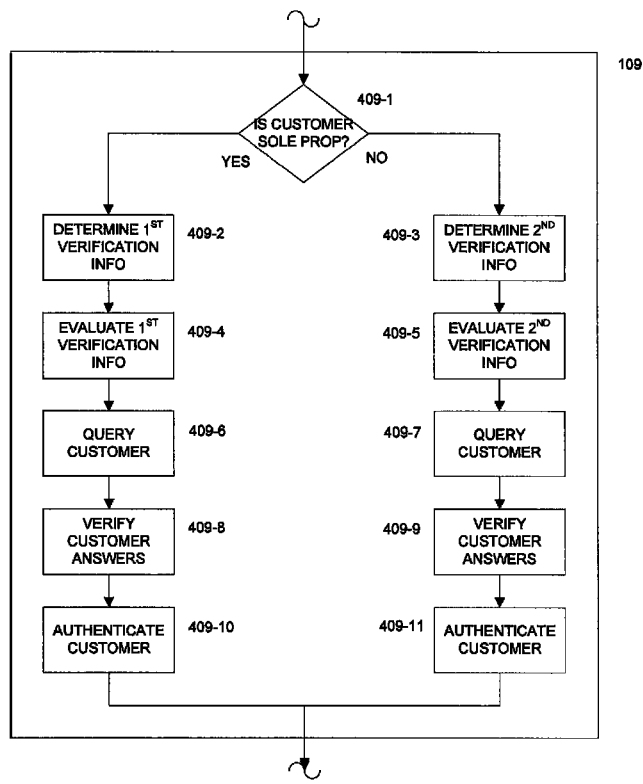
FIG. 4 is a flow chart representing evaluation, verification and authentication of a customer according to an embodiment of the disclosed subject matter.

If the first verification index is determined to be acceptable in Block 609-5B, the customer is further questioned as shown in Block 609-5E and Block 409-7 of FIG. 4, specifically questions for the authorized representative that authenticate the identity of the agent may be asked. The given answers are verified in Block 609-5F, Block 409-9, and a determination as to the acceptability of the answers is made in decision Block 609-5G. If the answers are found to be unacceptable, such as incomplete or false answers regarding the relationship of the customer to the financial institution, a determination is made as to whether the customer is an existing client as indicated in decision Block 609-5H, If the customer is an existing client of the financial institution, the customer is provided an exception and a manual review may be performed as represented by Block 609-5T. The customer is "pending" as discussed above and while further processing directed to acceptance of the application may be halted, information may continue to be collected and products may continue to be presented. It is important to note that both the business and the identity of the agent should be verified when dealing with a non-sole proprietorship. If the customer is not an existing client the application process ends as shown in Block 609-5I.

If the customer's answers are found acceptable in Block 609-5G the second verification index is evaluated as shown in Block 609-5J. If the second verification index is found not acceptable in Block 609-5K there is a determination of whether the customer is an existing client of the financial institution in decision Block 609-5L. If the customer is an existing client the application becomes pending as shown in Block 609-5T. If the customer is not an existing client a determination is made regarding how long the customer's business has been an ongoing enterprise or how old the business is. If the business age is less than a predetermined threshold age as determined in decision Block 609-5M the customer is placed in a pending stage as represented by Block 609-5T. The addition of exceptions processing is advantageous, for example, when the business is verified but the authorized agent has not been satisfactorily verified. The age of the business may be another indication of legitimacy. If the age of the business is not less than the threshold, the application process may end as shown in Block 609-5N. As shown further in FIG. 6, if the second verification index is found acceptable in Block 609-5K, an evaluation of a third evaluation index may be performed in Block 609-5O.

If the third verification index is not acceptable as determined in decision Block 609-5P, exception processing may be commenced as indicated in Block 609-5U. If the exception is not cleared in Block 609-5V, the process may end at Block 609-5W. If the exception is cleared in Block 609-5V or if the third verification index is acceptable as determined in Block 609-5P a fourth verification index may be determined as shown in Block 609-5Q, evaluated in Block 609-5R and a determination of its acceptability made in decision Block 609-5S. If the fourth index is not found to be acceptable the process may end as shown in Block 609-5N. If the fourth verification index is acceptable and the customer is authenticated as shown back on FIG. 4 in Block 409-11 then the process continues. The authentication is preferably based on the score or index relating to the second part of the third information and the verification of the customers answer or answers to the identity query.

In the embodiment shown in FIG. 6, the first verification index may be a business verification index, the second verification index may be an authorized representative verification index and the third may be an authorized representative to business index. The order of which some or all of the indexes are evaluated may be modified.

Returning to FIG. 1, if the customer identification is not verified in decision Block 110 the process ends or as discussed in relation to FIG. 6 an exception may be granted as shown in Block 111 of FIG. 1. If the customer ID is verified, the customer's credit score which may preferably be representative of the customer's credit worthiness is determined and verified as shown in Block 112. The credit score may be determined using a predetermined set of business rules such as those listed in FIG. 11A and/or using a predetermined set of risk evaluation rules such as those listed in FIG. 11B. The predetermined set of business rules may include decisions on one or more of a social security number evaluation, an identity theft evaluation, a retail indicator evaluation, a previous inquires evaluation, a closure summary evaluation, and a closure details evaluation. The decisions may be go/no-go or may be qualitative in nature. For example, if the social security number does not match the name, a no-go decision may be rendered, whereas the previous inquiries evaluation may result in a go/no-go decision or a qualified approval dependent upon another condition. Of course additional criteria reflective of the customer's credit worthiness may also be applied.

Figure 7:
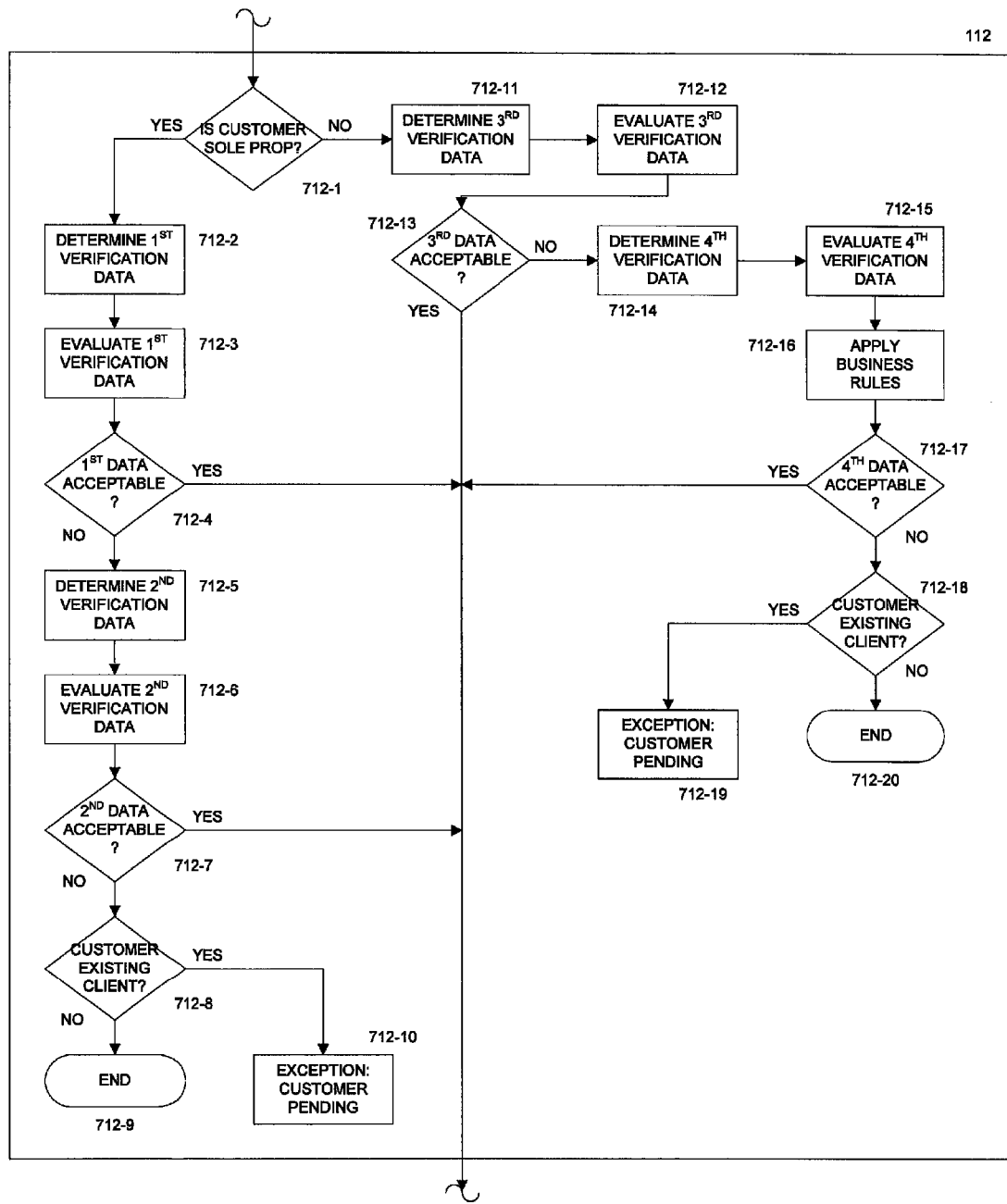
FIG. 7 is a flow chart representing the acceptance of a customer including exceptions of the verification indices according to another embodiment of the disclosed subject matter.

FIG. 7 is an embodiment for verifying customer credit according to an embodiment of the present subject matter. The process may be dependent upon the nature of the customer and thus again it is determined in decision Block 712-1 whether the customer is a sole proprietorship or not. If it is determined that the customer is a sole proprietorship in Block 712-1, a first set of verification data is determined and evaluated in Blocks 712-2 and 712-3, respectively. The first set of verification data may include owner information derived from an third party or held internally by the institution. The first set of verification data may be the information commonly managed by credit reporting agencies such as Equifax™. This information may be advantageously used to determine the credit risk. If the first verification data is acceptable as shown in decision block 712-4, the application procedure continues. If the first set of data is not acceptable a second set of verification data is determined and evaluated as shown in Blocks 712-5 and 712-6, respectively. The second verification data may also include owner information and the evaluation may be performed using a third party or internally. One such example of another third party determining and evaluating the second set of verification data is ChexSystems™. If the second set of verification data is found acceptable in decision Block 712-7, then the application proceeds from Block 113 in FIG. 1. However, if the second set of verification data is not acceptable, a determination is made whether the customer is an existing client of the financial institution, as shown in decision Block 712-8. If the customer is an existing customer, the customer application becomes pending and may be granted an exception after a manual review, as represented by Block 712-9. Otherwise the application process is terminated as shown in Block 712-9. If the customer is found not to be a sole proprietorship a parallel process is taken.

Non-sole proprietorship customer's third set of verification data is determined and evaluated in Blocks 712-11 and 712-12 respectively. The third set of verification data may include business and authorized agent information and evaluated with information held by a third party or internally by the financial institution. If the third set of verification data is found acceptable in decision Block 712-13, the application process continues. If the third set of verification data is not acceptable a fourth set of verification data is determined and evaluated as shown in Block 712-14 and 712-15 respectively. The fourth set of verification data may also include business and authorized agent information and its evaluation may include comparison with information held by a third party or internally by the financial institution. The fourth set of verification data is also applied to a set of business rules established by the financial institution as shown in Block 712-16. The set of business rules may include decisions based on social security number evaluation, an identity theft evaluation, a retail indicator evaluation, a previous inquiries evaluation, a closure summary evaluation and a closure details evaluation. These rules may relate to past business activities of the authorized agent or owner. A list of the predetermined set of business rules is presented in FIG. 11A.

If the fourth set of verification data along with the application of business rules is acceptable as shown in decision block 712-17, the application process continues. The decision may be a go/no-go or may be qualitative in nature. However, if the data and application of the business rules are not acceptable, a determination regarding the customer's status as an existing client is made, as shown in Block 712-18. If the customer is an existing client and exception may be made and the customer may become pending subject to a manual review as shown in Block 712-19. If at this point in the application process the customer is not a client, the application process may be halted as shown in Block 712-20.

Table 2 illustrates an exemplary application of the business rules. The Hot File is whether the customer has a hit on the liability risk management file (LRM) and the Outcome is whether the application process continues.

TABLE 2

| Hot File | Client (new or existing) | Shared Fraud Database | Identity Verification (Score exceeds threshold) | Outcome |
|---|---|---|---|---|
| Yes | Any | Any | Any | Fail |
| No | New | Yes | Any | Fail |
| No | New | No | Yes | Fail |
| No | New | No | No | Pass |
| No | Existing | Any | Any | Pass |

Referring back to FIG. 1, a decision on the customer's credit is made as shown in Block 113. If the customer's credit is not approved, an exception may be made or the application process may be terminated as shown in Block 114. One process of ending the application or granting an exception is discussed above with respect to FIG. 7. If the customer's credit is accepted, customer account options are presented as shown in Block 115.

The account options presented may be based at least in part on the verification the third set of information and the information regarding the customer's credit score. The account options presented may also be a function of the set of risk evaluation rules as shown in FIG. 11B. These rules may include decisions on a social security number evaluation, an identity theft evaluation, a retail indicator evaluation, a previous inquires evaluation, a closure summary evaluation and a closure details evaluation. The decisions may be go/no-go or may be qualitative in nature. For example, if the social security number does not match the name, a no-go decision may be rendered, whereas the previous inquires evaluation may result in a go/no-go decision or a qualified approval dependent upon another condition.

Figure 8:
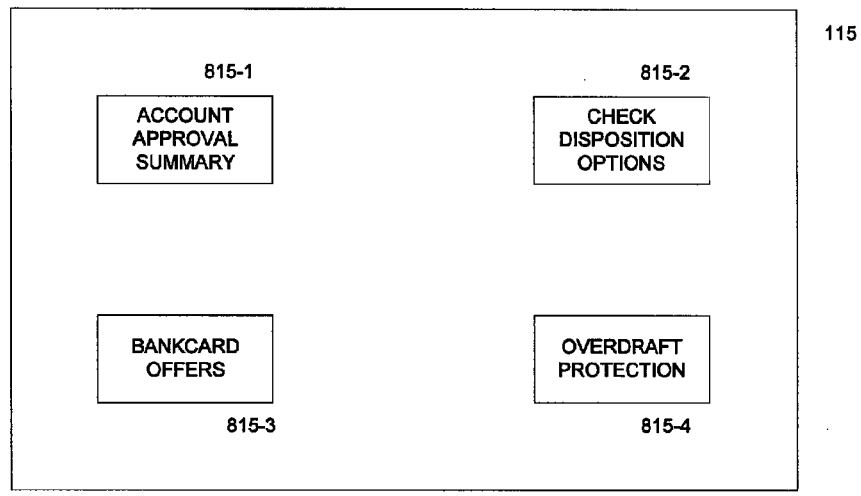
FIG. 8 is a representative chart of account services offered according to an embodiment of the disclosed subject matter.

The options presented to the customer may vary, however, a preferred list of account options are shown in FIG. 8. The options may include account approval summary as shown in Block 815-1, check disposition options, Block 815-2, Bankcard Offers, Block 815-3 and overdraft protection, Block 815-4. The account approval summary Block 815-1 may include information based on the outcome of the business identity and credit based risk verification as performed in the application process as well as affirmative indicia reflective of the approval status, such as approved or pending. The account approval summary may also indicate which additional information is required. The check disposition options, Block 815-2, may check status and include image statements of checks as well as other features representative of the disposition. The bankcard offers, Block 815-3, may include an offer or invitation to apply, it may include current interest rates and other terms or features available on the bankcards. The overdraft protection options, Block 815-4, may include several overdraft protection options based on the business relationship with the financial institution and the evaluation of the various information related to the customer. The overdraft protection options also presents options relating the linking of accounts and creation of new accounts for linking if none presently. Upon the selection of the account options, funding option may then be presented to the customer as shown in Block 116. The funding options presented may advantageously be based on the options selected by the customer.

The funding options are the methods in which the account options are to be created or funded. These options may include sending of a check, making a deposit at the financial institution or an affiliate, transfer of funds from another external financial institution or a transfer from a pre-existing account at the financial institution. In addition, other information may be requested from the customer for compliance purposes. The funding source may then be verified as shown in Block 117 by presenting back to the customer all accounts, funding methods, source of initial funds and the amount originally entered. The customer may modify any of the funding information before finalizing and submitting the funding. The customer may then be qualified for a check card.

In decision Block 118 it is determined whether the customer is to be enrolled for a check card. The decision to be enrolled in a check card may be determined as a function of the information previously supplied by the customer. If the customer is to be enrolled for a check card, information regarding the enrollment is collected and a level of enrollment is determined as shown in block 119. The level of enrollment may be based on at least one or more predetermined factors based upon risk factors or business factors, for example a low credit score would lead to a lower level while high business revenues may advocate for a higher level of enrollment. In addition the type of business and status of other accounts may also be used to determine the level of enrollment for the check card. Table 3 shows exemplary levels of enrollment, with relative spending and withdrawal limits. It is next determined if the customer is to be enrolled in Business on-line as shown in Block 120.

TABLE 3

| Authorization | Level | Daily Spending Limits | ATM Withdrawal Limit |
|---|---|---|---|
| Signer/Authorized Representative | High | $6,000 | $1,500 |
| Signer/Authorized Representative | Medium | $3,500 | $1,000 |
| Signer/Authorized Representative | Low | $1,500 | $500 |

The business on-line program includes collecting enrollment information and determining a statement suppression option. A decision to enroll the customer in merchant service program may be determined as shown in Block 121. Information required for enrollment in merchant service is collected as shown in Block 122.

Figure 9:
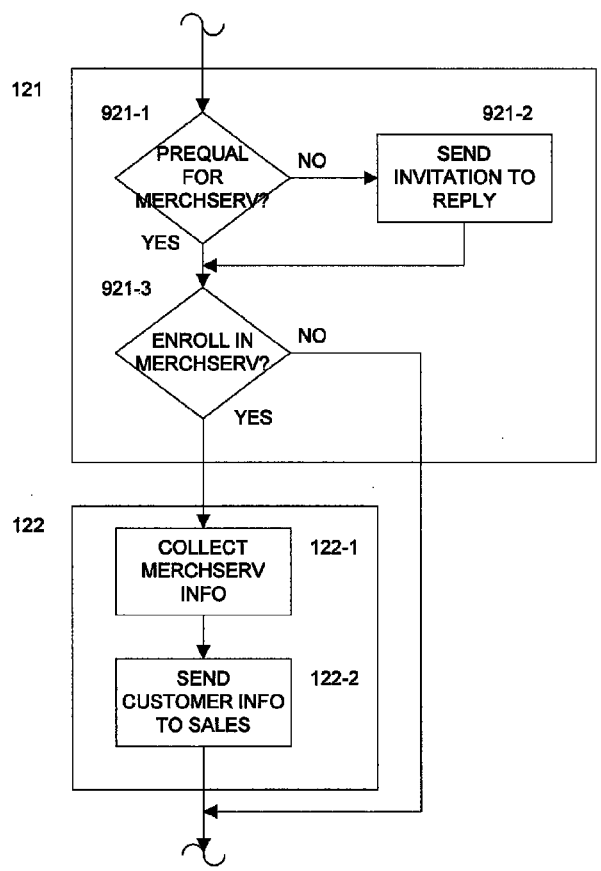
FIG. 9 is a flow chart representing the qualifying of a customer for merchant service according to an embodiment of the disclosed subject matter.

FIG. 9 is a flow chart for an embodiment for enrollment in merchant service. Based on known information and one or more predetermined factors, it may be determined if the customer may be prequalified for merchant service as shown in decision block 921-1. If the customer is situated to be prequalified an invitation to apply is sent to the customer as shown in Block 921-2. If the customer is prequalified, they are presented with the option to enroll in decision Block 921-3. If the customer chooses to enroll, information necessary for enrollment is collected in Block 122-1 and customer information is sent to the sales department as shown in Block 122-2 as a lead. Thereafter the merchant service provider may contact the customer to further the enrollment into the service. This same process may be used to provide other third party vendors with the opportunity to provide the customer with services related to their business type, needs or financial situations, without the financial institution having to disclose information to unsolicited third parties.

The customer is presented with a final presentation including customer information related to the customer's products, accounts and or enrollments reflective of the status of their on-line banking opening as shown in Block 123. The final presentation may present a summary of the product offerings selected by the customer. The name on the check card, authorization level and tier may also be displayed for all check cards enrolled. Business On-line Program user ID and company ID may be displayed also with information associated with their use. Accounts having overdraft protection selected, may also be identified along the overdraft account information. Bank Card offers that were accepted may be displayed as well as other third party offers accepted by the customer. The nearest branch location and other information a new client would find useful may be displayed as well. Contact information including phone number, addresses, email addresses and web pages may be presented to the customer during final presentation.

Additional products and offers may be communicated to the customer in the final summary, these products and offers may be only tangentially related or provided by third parties, these advertisements may also be presented based on the information collected during the on-line process and may be selected by the financial institution. Selection by the financial institution prevents the unwanted disclosure of private information but still allows the advertizing to be marketed based on financial or business status. The customer may also be given the opportunity to order checks and other products related to the opening of the account. For this additional product offering, the customer may be connected to another site. Upon fulfillment of the terms and conditions of enrollment and funding, the on-line banking opening may be complete as shown in Block 124. Telephone support may thus begin as shown in Block 126, and the opening process ends as shown in Block 125. Telephone assistance may also be available while in the process of on-line banking enrollment, to further aid the process.

Embodiments of the disclosed subject matter may utilize drop down menus to show the options available to the customer and simplify their selection. The website format may also be selectable for use in mobile equipment such as Blackberries and PDA equipment, where screen space and functionality may be more limited than on a personal computer. Communications between the customer and the financial institution during the opening of an account may advantageously be encrypted.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

What we claim is:

1. A method of interfacing with a financial institution using a computer interface, the method comprising the steps of:
    (a) receiving at a first computer system of the financial institution an interface request from a customer after the customer has reached, via a path through a computer network, a predetermined webpage for the financial institution;
    (b) presenting at a second computer being operated by the customer to interface with the financial institution a first content to the customer, wherein said first content includes a list of products offered by the financial institution;
    (c) receiving at the first computer system a first input from the customer, wherein said first input includes a product choice from the list of products offered by the financial institution;
    (d) determining at the first computer system whether the customer is a current online client of the financial institution by authenticating a first set of information submitted by the customer wherein the first set of information includes at least one of: an online client user identification and password for the customer; if the customer is a sole proprietorship a last name of an owner of the sole proprietorship and part of an identification number associated with the owner; if the customer is a non-sole proprietorship a business name and a part of an identification number associated with the customer, and verifying a pre-existing client identification profile for the customer;
    (e) receiving at the first computer system a second set of information sent by the customer wherein the second set of information includes at least one of business information for the customer, information for an authorized agent for the customer, and information for an authorized signer for the customer;
    (f) presenting at the second computer the second set of information to the customer for review by the customer and receiving a third set of information from the customer wherein the third set of information comprises the second set of information and any modifications to the second set of information made by the customer;
    (g) presenting at the second computer a set of terms and conditions to the customer;
    (h) receiving at the first computer system an application from the customer;
    (i) verifying at the first computer system a first part of the third set of information if the customer is a sole proprietor;
    (j) verifying at the first computer system a second part of the third set of information if the customer is not a sole proprietor;
    (k) determining at the first computer system a credit score for the customer which is representative of the customer's credit;
    (l) presenting at the second computer a set of account options to the customer wherein the account options presented are based at least in part on the verification of the third set of information and the customer's credit score;
    (m) receiving at the first computer system a second input from the customer, wherein the second input comprises a decision including at least one of sending a check by mail to the financial institution, making a deposit at a branch of the financial institution, electronically transferring funds to the financial institution from a source outside of the financial institution, and providing funding from a preexisting account at the financial institution;
    (n) verifying at the first computer system the second input;
    (o) determining at the first computer system if the customer is to be enrolled for a checkcard and if so processing at the first computer system a checkcard enrollment for the customer at a predefined level based at least in part on one or more first predetermined factors;
    (p) determining at the first computer system whether the customer is to be enrolled in a business online program;
    (q) determining at the first computer system whether the customer is to be enrolled in a third-party merchant services program based at least in part on predetermined requirements for the third-party merchant and if so processing at the first computer system a merchant services program enrollment for the customer at a predefined level based at least in part on one or more second predetermined factors; and
    (r) presenting at the second computer information to the customer related to the customer's products, accounts, or enrollments,
    wherein the verifying of the second part of the third set of information includes determining a second verification information, evaluating the second verification information including comparing the first part of the third set of information with at least one of publicly-available information for the customer or information for the customer predetermined by the financial institution, querying the customer, verifying the customer's answers to the queries, and authenticating the customer based on the second verification information and the customer's answers, and wherein the evaluation of the second verification information includes:
(i) evaluating a first verification index;
(ii) if the first verification index is acceptable, querying the customer and verifying the customer's answers, otherwise if the first verification index is not acceptable or if the customer's answers are not acceptable, determining if the customer is an existing client of the financial institution and if so, placing the customer in a pending status;
(iii) if the customer's answers are acceptable, evaluating a second verification index;
(iv) if the second verification index is not acceptable, determining if the customer is an existing client of the financial institution and if so, placing the customer in a pending status, otherwise if the customer is not an existing client of the financial institution, determining if the age of the customer's business is less than a predetermined threshold and if so, placing the customer in a pending status;
(v) if the second verification index is acceptable, evaluating a third verification index;
(vi) if the third verification index is acceptable, determining a fourth verification index, evaluating the fourth verification index, and if the fourth verification index is not acceptable, ending the process; and
(vii) if the third verification index is not acceptable, performing exception processing and if the exception is not cleared, ending the process, otherwise if the exception is cleared, determining a fourth verification index, evaluating the fourth verification index, and if the fourth verification index is not acceptable, ending the process,
wherein the first verification index includes information related to a business of the customer, the second verification index includes personal information for an authorized representative of the customer, the third verification index includes information for a relationship between the authorized representative of the customer and the business of the customer, and the fourth verification index is based on a fraud evaluation of the customer and the authorized representative of the customer.

2. The method of claim 1 wherein the first content includes at least one of a checking account and a savings account.

3. The method of claim 1 wherein the first content includes a deposit account.

4. The method of claim 3 wherein the deposit account is selected from the group consisting of: certificate of deposit, individual retirement account, retirement account, a 401(k) account, and combinations thereof.

5. The method of claim 1 wherein the first content is determined by the path through the computer network.

6. The method of claim 1 wherein the first content includes a list of products, and wherein one of the products is automatically chosen for highlighting on a display device being viewed by the customer wherein the product highlighted is based on the path through the computer network.

7. The method of claim 1 wherein some of the first part of the third set of information is the same as some of the second part of the third set of information.

8. The method of claim 1 wherein the verifying of the first part of the third set of information includes determining a first verification information, evaluating the first verification information including comparing the first part of the third set of information with at least one of publicly-available information for the customer or information for the customer predetermined by the financial institution, querying the customer, verifying the customer's answers to the queries, and authenticating the customer based on the first verification information and the customer's answers.

9. The method of claim 1 wherein determining the second verification information includes determining a first verification index, a second verification index, and a third verification index and wherein evaluating the second verification information includes evaluating the first, second, and third verification indices, wherein the first verification index includes information related to a business of the customer, the second verification index includes personal information for the customer, and the third verification index includes information for an authorized representative of the customer.

10. The method of claim 1 wherein the step of verifying the first part of the third set of information includes evaluating a first set of predetermined criteria including at least one of a determination of whether the customer is a new or existing client of the financial institution, a determination of whether the customer has been identified as a fraudster or abuser by the financial institution, a determination of whether the customer has been identified as a fraudster by a second financial institution, and a determination of whether a customer identity verification score for the customer exceeds a predetermined threshold.

11. The method of claim 1 wherein the step of verifying the second part of the third set of information includes evaluating a second set of predetermined criteria including at least one of a determination of whether the customer is a new or existing client of the financial institution, a determination of whether an authorized agent or an authorized signer of the customer has been identified as a fraudster or abuser by the financial institution, a determination of whether an authorized agent or an authorized signer of the customer has been identified as a fraudster by a second financial institution, and a determination of whether a customer identity verification score for an authorized agent or an authorized signer of the customer exceeds a predetermined threshold.

12. The method of claim 1 wherein the determining of the customer's credit score includes:
(i) if the customer is a sole proprietor:
(A) determining and evaluating a first set of verification data;
(B) if the first set of verification data is not acceptable, determining and evaluating a second set of verification; and
(C) if the second set of verification data is not acceptable, determining if the customer is an existing client of the financial institution and if so, placing the customer in a pending status;
(ii) if the customer is not a sole proprietor:
(A) determining and evaluating a third set of verification;
(B) if the third set of verification data is not acceptable, determining and evaluating a fourth set of verification data and applying a predetermined set of business rules;
(C) if the fourth set of verification data is not acceptable, determining if the customer is an existing client of the financial institution and if so, placing the customer in a pending status,
wherein the first set of verification data includes information from a first database for an owner of a business of the customer, the second verification data includes information from a second database for the owner of a business of the customer, the third verification data includes information from the first database for an authorized agent of the customer, and the fourth verification data includes information from the second database for the authorized agent of the customer.

13. The method of claim 12 wherein the predetermined set of business rules includes a go and or no go decision of at least one of a social security number evaluation, an employer identification number evaluation, a tax identification number evaluation, an identity theft evaluation, a retail indicator evaluation, a previous inquiries evaluation, a closure summary evaluation, and a closure details evaluation.

14. The method of claim 1 wherein the presenting of the set of account options to the customer is based at least in part on a predetermined set of risk evaluation rules.

15. The method of claim 14 wherein the predetermined set of risk evaluation rules includes a go and or no go decision of at least one of a social security number evaluation, an employer identification number evaluation, a tax identification number evaluation, an identity theft evaluation, a retail indicator evaluation, a previous inquiries evaluation, a closure summary evaluation, and a closure details evaluation.

16. The method of claim 1 wherein the set of account options is selected from the group consisting of: check disposition, preapproved bank card, invitation to apply for a bank card, overdraft protection, and combinations thereof.

17. The method of claim 1 wherein the first predetermined factors include at least one of the customer's choice of at least one predefined access level and a type of account to be associated with the checkcard.

18. The method of claim 1 wherein the processing for business online program enrollment includes collecting enrollment information and determining whether the customer will choose a statement suppression option.

19. The method of claim 1 wherein the processing for merchant services program enrollment includes at least one of a verification of the third set of information and an evaluation of the customer's credit score.

20. The method of claim 1 wherein the processing for merchant services program enrollment includes:
    (a) determining if the customer is prequalified for the merchant services program and if not, send to the customer an invitation to apply for the merchant services program; and
    (b) if the customer desires to enroll in the merchant services program, collecting enrollment information and sending information about the customer to a sales representative of the financial institution.

21. The method of claim 1 wherein the step of determining if the customer is to be enrolled for a checkcard includes a checkcard for an owner associated with the customer or a checkcard for a signer associated with the customer.

22. The method of claim 1 further including the step of:
    (u) receiving from the customer an order for checks or deposit slips.

23. The method of claim 1 further including the step of:
    (u) receiving a telephone call from the customer at a call center associated with the financial institution wherein a telephone operator at the call center can access the customer's products, accounts, and/or enrollments via a computer interface while on the telephone with the customer.

24. A method of interfacing with a financial institution using a computer interface, the method comprising the steps of:
    (a) receiving at a first computer system of the financial institution an interface request from a customer after the customer has reached, via a path through a computer network, a predetermined webpage for the financial institution;
    (b) presenting at a second computer being operated by the customer to interface with the financial institution a first content to the customer, wherein said first content includes a list of products offered by the financial institution;
    (c) receiving at the first computer system a first input from the customer, wherein said first input includes a product choice from the list of products offered by the financial institution;
    (d) determining at the first computer system whether the customer is a current online client of the financial institution by authenticating a first set of information submitted by the customer wherein the first set of information includes at least one of: an online client user identification and password for the customer; if the customer is a sole proprietorship a last name of an owner of the sole proprietorship and part of an identification number associated with the owner; if the customer is a non-sole proprietorship a business name and a part of an identification number associated with the customer, and verifying a pre-existing client identification profile for the customer;
    (e) receiving at the first computer system a second set of information sent by the customer wherein the second set of information includes at least one of business information for the customer, information for an authorized agent for the customer, and information for an authorized signer for the customer;
    (f) presenting at the second computer the second set of information to the customer for review by the customer and receiving a third set of information from the customer wherein the third set of information comprises the second set of information and any modifications to the second set of information made by the customer;
    (g) presenting at the second computer a set of terms and conditions to the customer;
    (h) receiving at the first computer system an application from the customer;
    (i) verifying at the first computer system a first part of the third set of information if the customer is a sole proprietor;
    (j) verifying at the first computer system a second part of the third set of information if the customer is not a sole proprietor;
    (k) determining at the first computer system a credit score for the customer which is representative of the customer's credit;
    (l) presenting at the second computer a set of account options to the customer wherein the account options presented are based at least in part on the verification of the third set of information and the customer's credit score;
    (m) receiving at the first computer system a second input from the customer, wherein the second input comprises a decision including at least one of sending a check by mail to the financial institution, making a deposit at a branch of the financial institution, electronically transferring funds to the financial institution from a source outside of the financial institution, and providing funding from a preexisting account at the financial institution;
    (n) verifying at the first computer system the second input;
    (o) determining at the first computer system if the customer is to be enrolled for a checkcard and if so processing at the first computer system a checkcard enrollment for the customer at a predefined level based at least in part on one or more first predetermined factors;

(p) determining at the first computer system whether the customer is to be enrolled in a business online program;

(q) determining at the first computer system whether the customer is to be enrolled in a third-party merchant services program based at least in part on predetermined requirements for the third-party merchant and if so processing at the first computer system a merchant services program enrollment for the customer at a predefined level based at least in part on one or more second predetermined factors; and (r) presenting at the second computer information to the customer related to the customer's products, accounts, or enrollments, wherein the verifying of the second part of the third set of information includes determining a second verification information, evaluating the second verification information including comparing the first part of the third set of information with at least one of publicly-available information for the customer or information for the customer predetermined by the financial institution, querying the customer, verifying the customer's answers to the queries, and authenticating the customer based on the second verification information and the customer's answers, and wherein the evaluation of the second verification information includes:

(i) evaluating a first verification index;

(ii) if the first verification index is acceptable, querying the customer and verifying the customer's answers, otherwise if the first verification index is not acceptable or if the customer's answers are not acceptable, determining if the customer is an existing client of the financial institution and if so, placing the customer in a pending status;

(iii) if the customer's answers are acceptable, evaluating a second verification index;

(iv) if the second verification index is not acceptable, determining if the customer is an existing client of the financial institution and if so, placing the customer in a pending status, otherwise if the customer is not an existing client of the financial institution, determining if the age of the customer's business is less than a predetermined threshold and if so, placing the customer in a pending status; and (v) if the second verification index is acceptable, evaluating a third verification index:

(A) if the third verification index is not acceptable for an authorized agent of the customer, performing exception processing and if the exception is not cleared, ending the process, otherwise if the exception is cleared, determining a fourth verification index, evaluating the fourth verification index, and if the fourth verification index is not acceptable, ending the process;

(B) if the third verification index is acceptable for an authorized agent of the customer, determining a fourth verification index, evaluating the fourth verification index, and if the fourth verification index is not acceptable, ending the process, wherein the first verification index includes information related to a business of the customer, the second verification index includes personal information for an authorized representative of the customer, the third verification index includes information for a relationship between the authorized representative of the customer and the business of the customer, and the fourth verification index includes a fraud evaluation of the customer and the authorized representative of the customer.

* * * * *